W. H. FREEMAN.
HOOD FOR MOTOR CARS OR OTHER VEHICLES.
APPLICATION FILED JAN. 30, 1914.
1,175,515.
Patented Mar. 14, 1916.
5 SHEETS—SHEET 1.
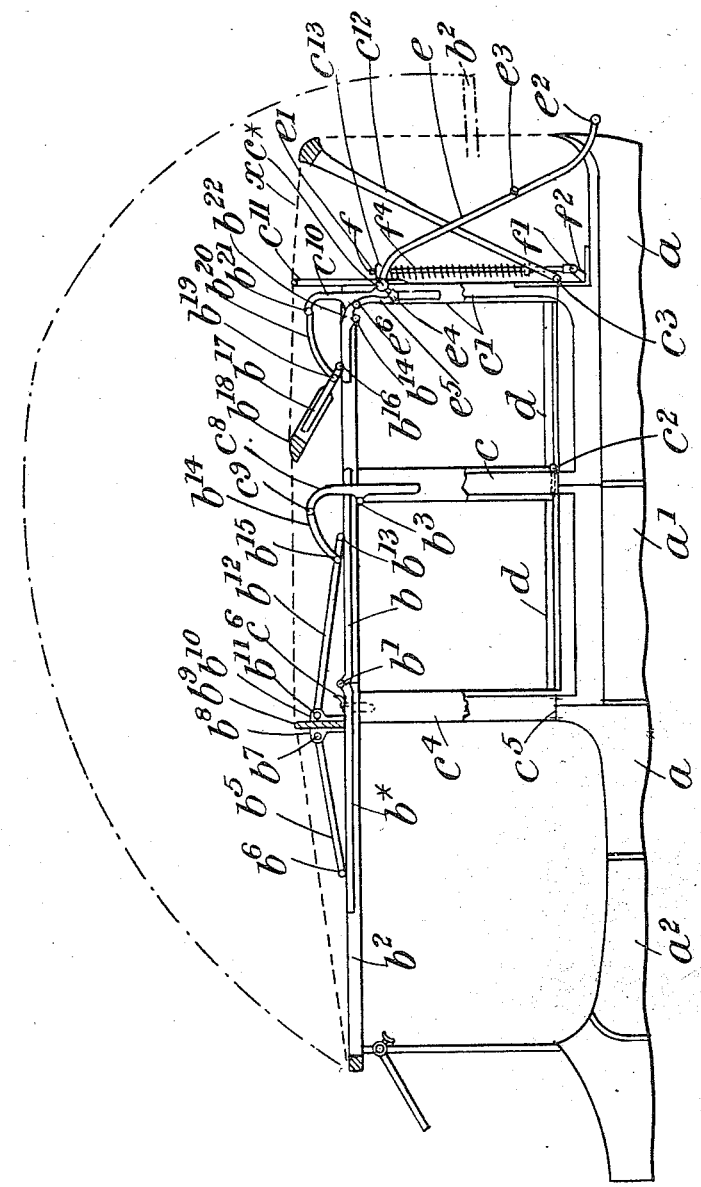
WITNESSES:
John C. Sanders
Albert T. Houman
INVENTOR:
William Henry Freeman
BY Wm. Wallace White
ATTY.

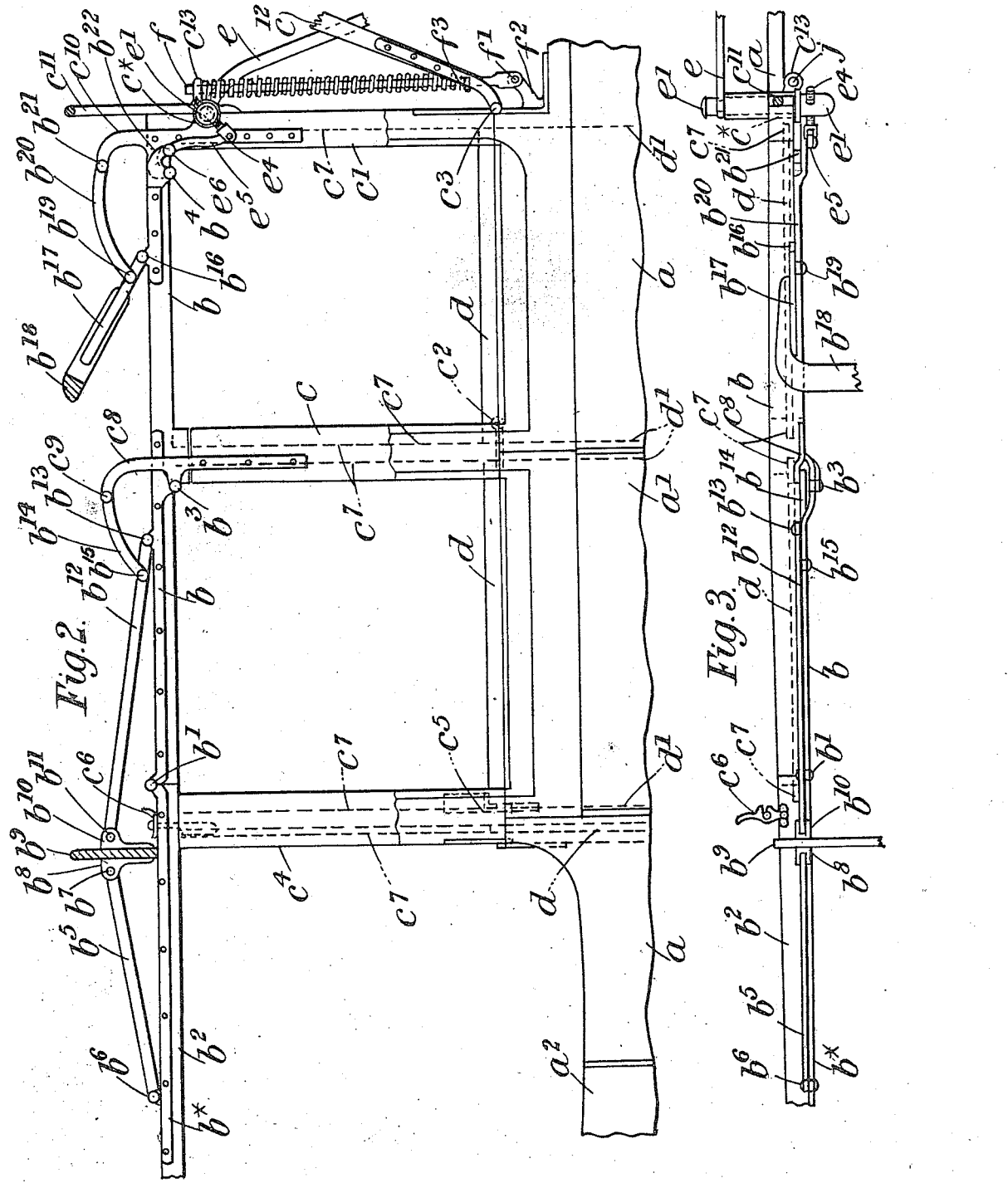

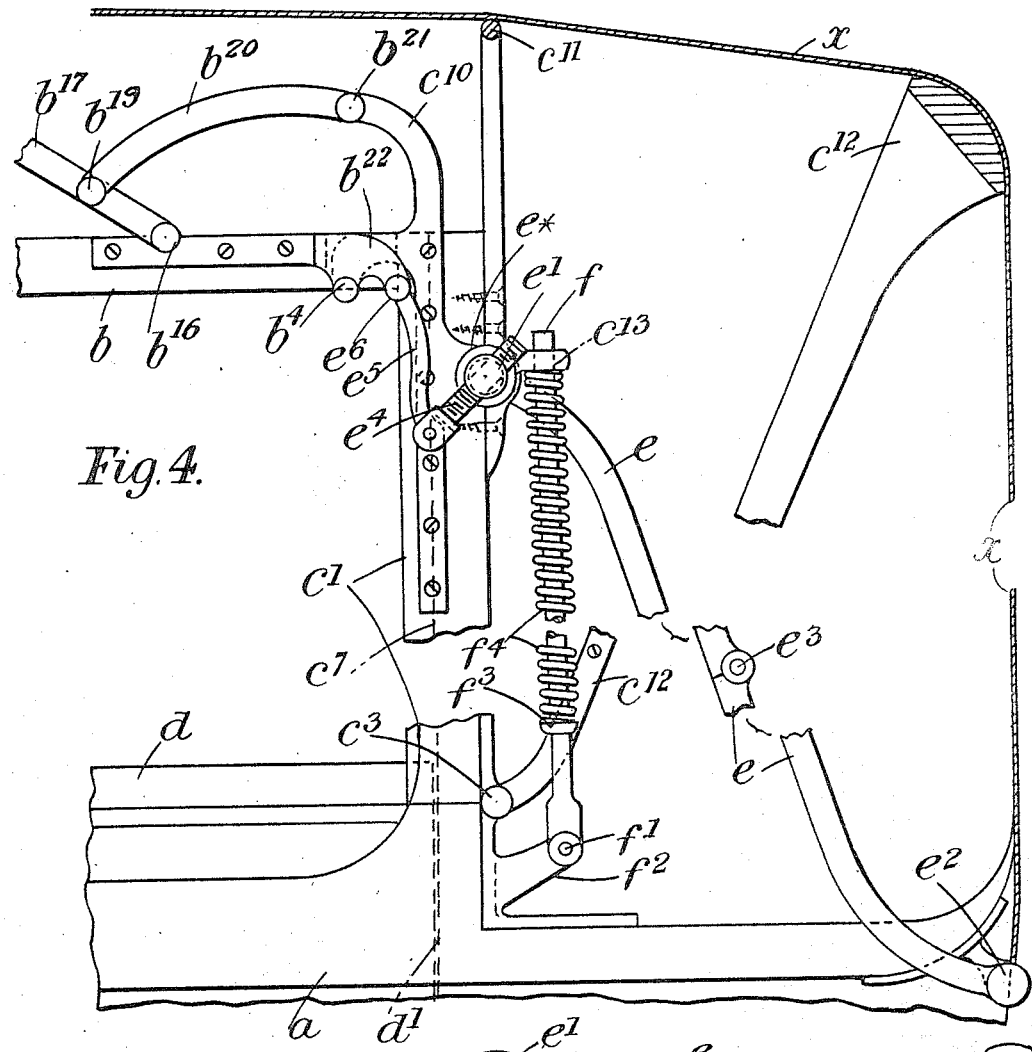
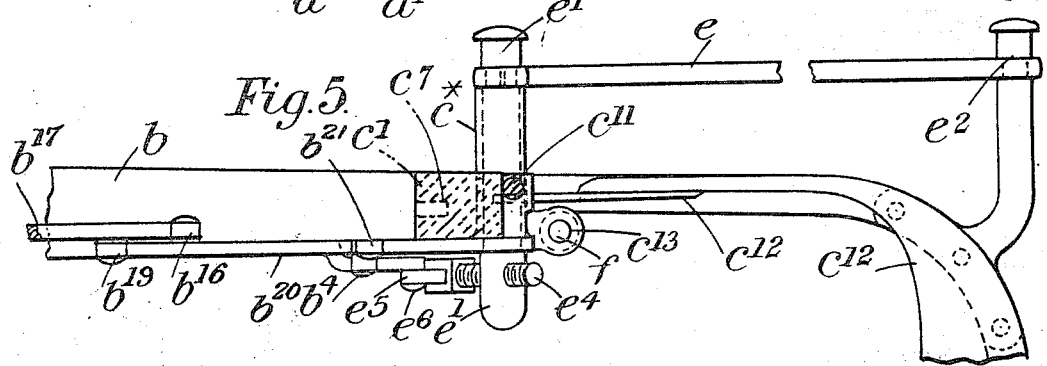

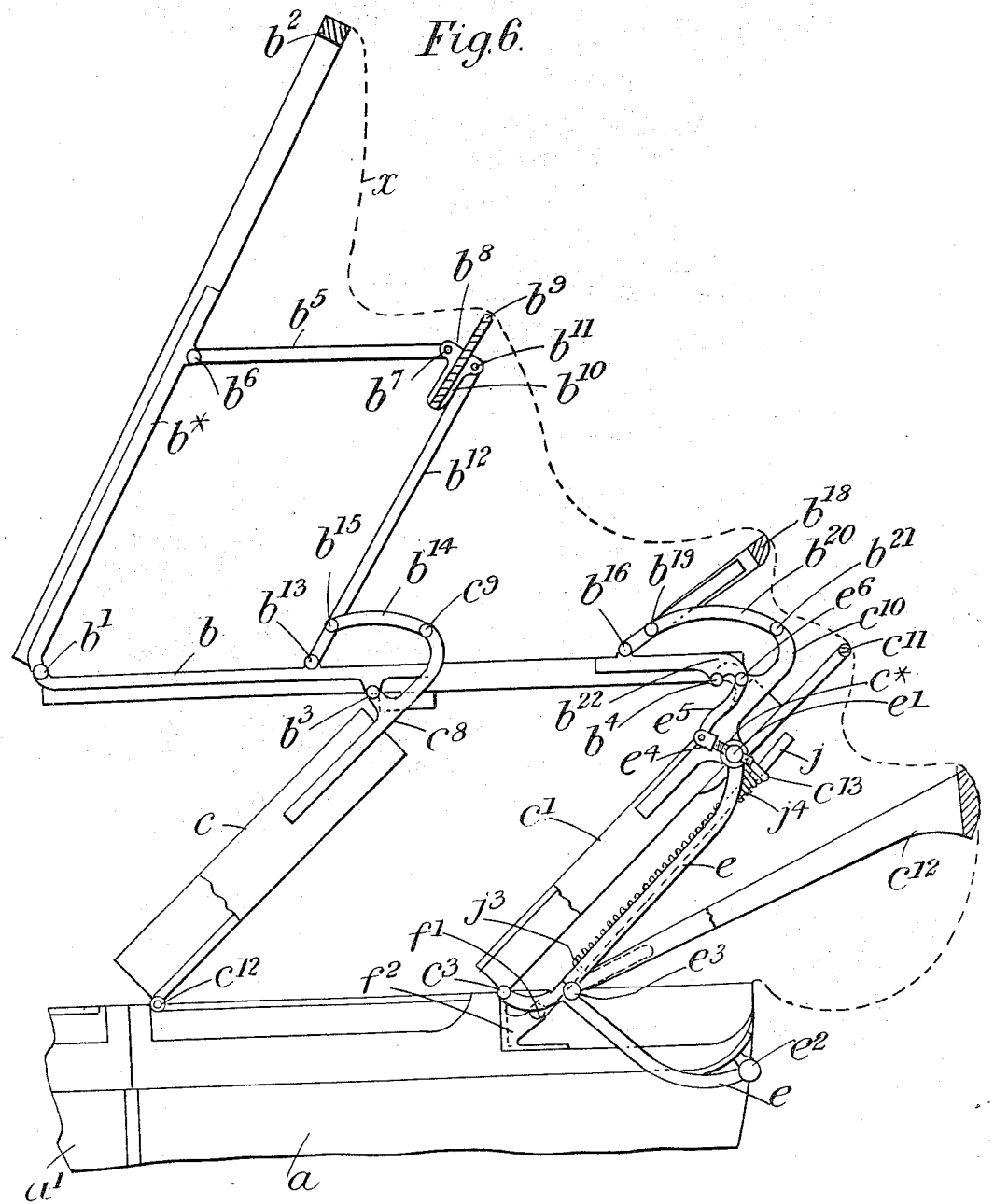

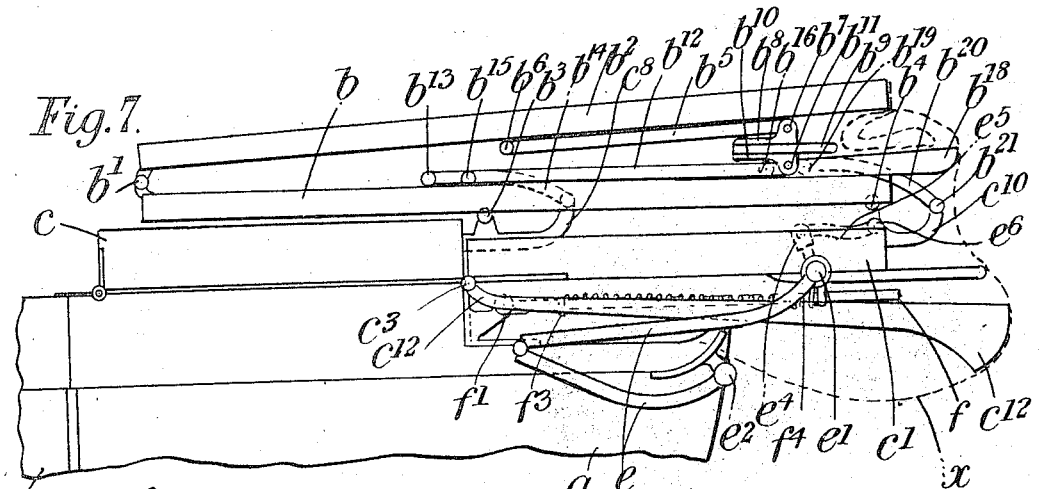
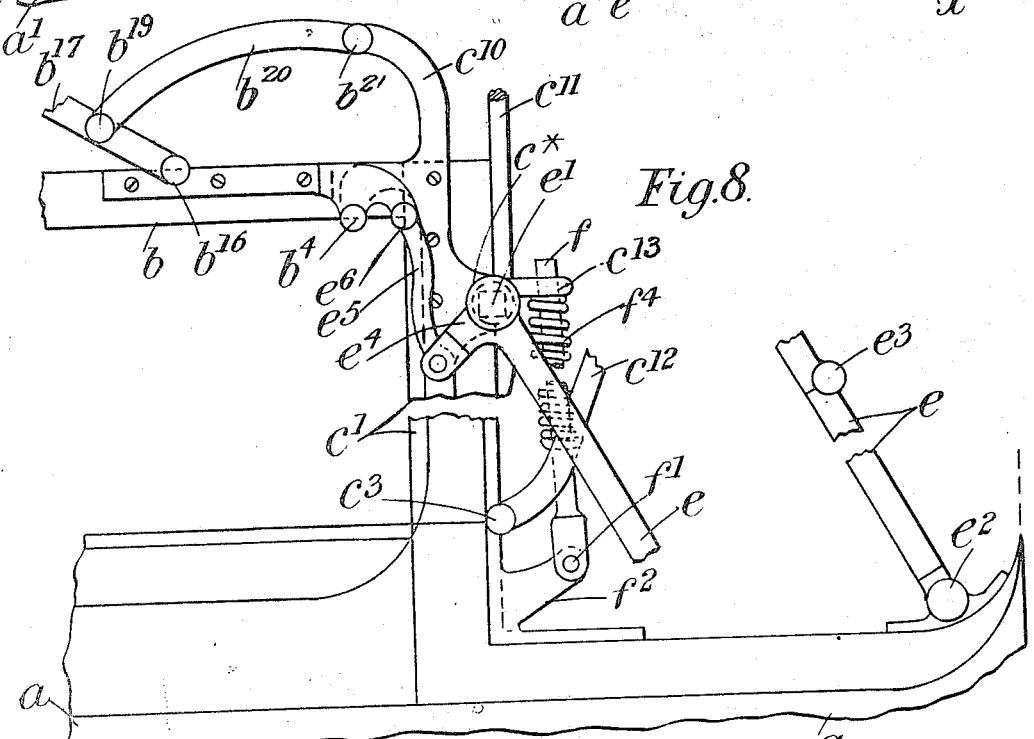
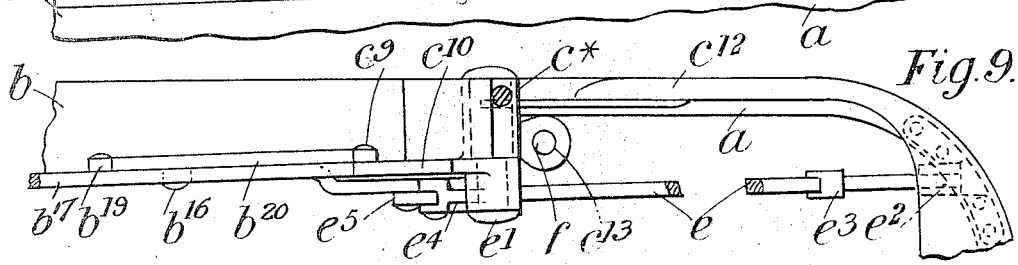

UNITED STATES PATENT OFFICE.

WILLIAM HENRY FREEMAN, OF CLAPHAM COMMON, LONDON, ENGLAND.

HOOD FOR MOTOR-CARS OR OTHER VEHICLES.

1,175,515.

Specification of Letters Patent. Patented Mar. 14, 1916.

Application filed January 30, 1914. Serial No. 815,405.

*To all whom it may concern:*

Be it known that I, WILLIAM HENRY FREEMAN, a subject of the King of Great Britain, residing at 16 Bowood road, West Side, Clapham Common, in the county of London, England, motor-body maker, have invented certain new and useful Improvements in or Connected with Hoods for Motor-Cars or other Vehicles, of which the following is a specification, reference being had to the drawings hereunto annexed and to the figures and letters marked thereon—that is to say:

The invention relates to improvements in or connected with hoods for motor cars or other vehicles.

The primary object of the present invention is to obtain a long hood suitable for a many seated car which will extend over the entire body of the car and fold back from the front thereof without the necessity for the employment of joints inwardly folding behind the driver's seat so that the hood may be easily manipulated by one person and the invention comprises various details of construction as hereinafter set forth.

In the accompanying drawings: Figure 1 is a side elevation, partly in section of a hood constructed according to the present invention, fitted to a motor car. Fig. 2 represents part of Fig. 1. Fig. 3 is a plan of one side of Fig. 2. Fig. 4 is a detail view of part of Fig. 1. Fig. 5 is a plan of one side thereof. Fig. 6 represents part of Fig. 1, but shows the hood partly collapsed or folded. Fig. 7 is a side elevation of Fig. 6 but showing the hood completely collapsed or folded. Fig. 8 is a side elevation of parts illustrating a slight modification and Fig. 9 is a plan thereof.

In the several figures like parts are indicated by similar letters of reference and Figs. 2, 3, 6, and 7 are drawn to an increased scale and Figs. 4, 5, 8 and 9 are drawn to a further increased scale with respect to the other figures of the drawings.

Referring to Figs. 1 to 7, $a$ represents the body of a motor car, $a'$ represents the door for passengers and $a^2$ represents the door for the driver. $b$ represents a long horizontal stay which at about its mid-length is divided into two parts and these parts are united by a butt joint $b'$, and the two parts of the long horizontal stay are, for the sake of clearness, lettered as regards the front section $b^*$, and as regards the after or rear section or part $b$. The front section $b^*$ of the long horizontal stay carries a hoop stick $b^2$ and the sections $b^* b$ are so arranged that the front section $b^*$ together with its hoop stick $b^2$ will fold upwardly as indicated by the dot and dash lines in Fig. 1. The rear section $b$ of the long horizontal stay is pivotally connected at $b^3 b^4$ to the upper ends of falling pillars $c c'$ which pillars are, at their lower ends, pivotally connected to the car body $a$ at $c^2 c^3$ so that they fold down rearwardly of the car on the side of the car body $a$ as shown at Figs. 6 and 7. The rear one $c'$ of the falling pillars, which may be called the back falling pillar, is arranged near to the rear of the car body $a$ and the other or front falling pillar $c$ is arranged to the rear of the door $a'$.

At the front of the door $a'$ are provided laterally and inwardly falling pillars $c^4$ which are pivotally connected to the car body $a$ at $c^5$ and these pillars $c^4$ are at their upper ends secured by suitable catches or fastenings $c^6$ of a well known kind to the front section $b^*$ of the long horizontal stay at a point in front of the butt joint $b'$. The three sets of pillars $c' c c^4$ are provided with oppositely arranged grooves $c^7$ in which, in the erect position of the hood as shown at Figs. 1 and 2, slide window sashes $d$ and these sashes $d$ in their lowered positions are received into pockets $d'$ in the car body $a$ in the well known manner. These three sets of pillars are pivoted upon the upper edges of the body $a$ so as to fold into recesses formed in the upper edge of the body and to become a part thereof and make the device more compact when the latter is folded as may be clearly seen from Fig. 7 of the drawings. To the front section $b^*$ of the long horizontal stay is pivotally connected at $b^6$ one end of a rearwardly and upwardly inclined stay $b^5$, the other end of which is connected at $b^7$ to a bracket $b^8$ to which is fixed a vertical board or screen $b^9$ which serves the purpose of a hoop stick and at the same time stops the draft passing along the underside of the cover $x$ of the hood. To the other side of the wind screen $b^9$ is fixed a bracket $b^{10}$ to which is pivotally connected at $b^{11}$ one end of a rearwardly and downwardly inclined stay $b^{12}$ which assists to carry the wind stop or screen $b^9$ and this stay $b^{12}$ is pivotally connected at $b^{13}$ to the rear section $b$ of the long horizontal stay at a point adjacent to the falling pillar $c$, The falling pillar $c$ has fixed to it an upwardly extending and forwardly curved strap or projection $c^8$ to which is pivotally connected at $c^9$ one end of a curved link $b^{14}$, the other end of which is pivotally connected at $b^{15}$ to the downwardly and rearwardly inclined stay $b^{12}$ near to its axis $b^{13}$. To the rear end of the rear section $b$ of the long horizontal stay is pivotally connected at $b^{16}$ one end of an upwardly and forwardly extending stay $b^{17}$ which carries another hoop stick $b^{18}$ and to this stay $b^{17}$ is pivotally connected at $b^{19}$ near to its axis $b^{16}$ one end of a curved link $b^{20}$, similar to that $b^{14}$ and the other end of this link $b^{20}$ is pivotally connected at $b^{21}$ to the extremity of an upwardly and forwardly projecting piece or strap $c^{10}$, similar to that $c^8$, fixed to the back falling pillar $c'$. By one end pivotally connected at $e'$ at a point near the upper part of the back falling pillar $c'$ is a stay $e$ which extends downwardly and rearwardly at an angle to the car body $a$ and is pivotally connected thereto at $e^2$ and this stay $e$ is provided with a butt joint $e^3$ in its length which requires to be broken in order to collapse the hood. The upper end of this jointed stay $e$ at its point of connection $e'$ with the back falling pillar $c'$ is provided with an adjustable crank or offset $e^4$, which is by a link $e^5$, pivotally connected at $e^6$ with a rearwardly projecting offset $b^{22}$ from the rear section $b$ of the long horizontal stay.

In the case of an outside jointed stay $e$ the crank $e^4$ takes the form of a threaded bolt, as shown in the drawings, which screws through a threaded transverse hole in the revoluble prop or axis $e'$ mounted in a long bearing $c^*$ carried by the back falling pillar $c'$ and extending to the outside of the hood and which prop or axis $e'$ is fixed with the jointed rearwardly extending stay $e$. The back falling pillar $c'$ carries a hoop stick $c^{11}$ and another or rearwardly extending hoop stick $c^{12}$ is pivoted at $c^3$ to the lower part of the back falling pillar $c'$. On lifting the front section $b^*$ of the long horizontal stay the front and back falling pillars $c$, $c'$ and the various stays and hoop sticks will, as shown at Figs. 6 and 7, fold one upon the other so that the hood assumes a neat and compact form when completely collapsed. The rearward motion which is thus imparted to the after section $b$ of the long horizontal stay through the link $e^5$ and crank $e^4$ of the rear jointed stay $e$ at the same time turns the rear jointed stay $e$ upon its axis $e'$ on the back falling pillar $c'$ and thus automatically breaks the joint $e^3$ of said stay.

In erecting or extending the hood the reverse movement given to the long horizontal stay $b$ $b^*$ extends the hood in the desired manner one person only being required to perform this work. In order to assist in raising or extending the hood a rod $f$ is pivotally connected at $f'$ by its lower end to a rearward offset $f^2$ at the lower end of the back falling pillar $c'$ and the upper end of this rod $f$ works through an eye $c^{13}$ formed on an offset from the back falling pillar $c'$ while between the eye $c^{13}$ and a shoulder $f^3$ on the rod $f$ near to the lower end thereof is provided a helical spring $f^4$ held slightly in compression which, by reason of the position of the pivot $f'$ at the lower end of the rod $f$, is, in the collapsing of the hood slightly compressed so that on raising the hood the spring will assert itself and assist that action.

In the example given at Figs. 8 and 9 is shown an arrangement where the rearwardly extending stay $e$ is formed with an inside joint connection with the prop or axis $e'$ and in this case the crank $e^4$ instead of being a threaded bolt, as described with respect to the previous arrangement, is formed on the upper end of the rearwardly extending stay $e$ but in other respects the parts and their action are identical with those hereinbefore described.

By the means hereinbefore described a convenient form of hood is obtained having an extended range adapted to cover a car of the type referred to and which is capable of being manipulated by one person.

Having now particularly described and ascertained the nature of the said invention and in what manner the same is to be performed I declare that what I claim is:—

1. In a carriage hood, and in combination, a car body formed with recesses therein, a pair of spaced pillars on each side of the body and pivotally secured thereto at their lower ends so that the same will fold into said recesses, horizontal stays for each pair of pillars and provided with joints intermediate their ends dividing said stays into two parts, the outer end of the front portion of said stays being adapted to support the front part of the cover, the back portion of said stays being secured to said pillars at their upper ends, vertical extensions on said pillars having their upper ends curved forwardly, foldable cover supports pivotally connected to said stays and arranged in advance of each of said extensions, links pivotally connecting the curved ends of each extension to the preceding foldable support, means for holding the entire device in an unfolded or extended position and allowing the same to fold or collapse, the said pillars, stays and supports being so arranged as to be automatically set and moved to an unfolded position in unison by the raising of said outer end of the front portion of said stays.

2. In a carriage hood, and in combination, a car body, pillars on each side of the body and pivotally secured thereto at their lower ends, a horizontal stay provided for the pillars on each side of the car body and formed with a hinged joint intermediate its ends dividing said stay into front and rear portions, means pivotally connecting the upper ends of said pillars to said stays, a foldable cover support pivoted to said stays, means extending from said pillars and pivotally connected with said foldable cover supports, rearwardly and downwardly extending jointed braces having their upper ends pivotally connected to said pillars and their lower ends pivotally connected to said body, adjustable cranks provided at the upper ends of said braces, offsets secured to the rear portions of said horizontal stays, and links connecting said offsets and said cranks.

In witness whereof I have hereunto set my hand in the presence of two witnesses.

WILLIAM HENRY FREEMAN.

Witnesses:
C. MELBOURNE WHITE,
C. H. WHITE.